INVENTOR.
HANS KLUMB

BY Christie, Parker & Hale
ATTORNEYS

United States Patent Office
2,785,571
Patented Mar. 19, 1957

2,785,571
VACUUM METERS

Hans Klumb, Mainz, Germany, assignor to W. E. Heraeus G. m. b. H., Hanau-am-Main, Germany, a corporation of Germany Application July 21, 1955, Serial No. 369,462
Claims priority, application Germany July 29, 1952
10 Claims. (Cl. 73—399)

This invention relates to vacuum gauges for measuring relatively low pressures.

More particularly, the invention provides an improvement in thermo-molecular vacuum gauges in which gas pressure is measured by observing the deflection imparted by gas molecules to a movable body disposed between two spaced members of different temperatures.

A common type of thermo-molecular vacuum gauge includes an inner cylinder coaxially disposed within an outer cylinder, and means for creating a temperature difference between the two cylinders. A rotatable sleeve is suspended between the two cylinders so that the sleeve coaxially surrounds the inner cylinder and is coaxially disposed within the outer cylinder. Due to the temperature difference between the two cylinders, gas flows from the warmer cylinder toward the cooler cylinder, and suitable openings and deflectors on the sleeve cause the sleeve to be rotated in an amount proportional to the gas pressure.

In this type of vacuum gauge the movable sleeve must necessarily be supported by delicate suspension means due to the small forces being detected. Such gauges have the disadvantage that the slightest shock or vibration can produce unwanted deflections and oscillations of the sleeve. Even the smallest shocks which inevitably occur when the instrument is installed or transported may be sufficient to exceed the structural strength of the suspension means. Thus, there is always present the possibility that the instrument will be permanently damaged, or at least lose its calibration when not in use.

The present invention provides means for mechanically locking and supporting the sleeve against vibration or shock when the instrument is not being used, and which automatically releases the sleeve when the instrument is to be used for a measurement.

In a preferred form of the invention, the thermal expansion strip is a bimetallic element connected to one of the members so that as the temperature of the member is changed, the bimetallic strip is deflected into and out of the contact with the movable sleeve.

These and other aspects of the invention will be more fully understood from the following detailed description taken in conjunction with the accompanying drawings in which.

Figure 1:
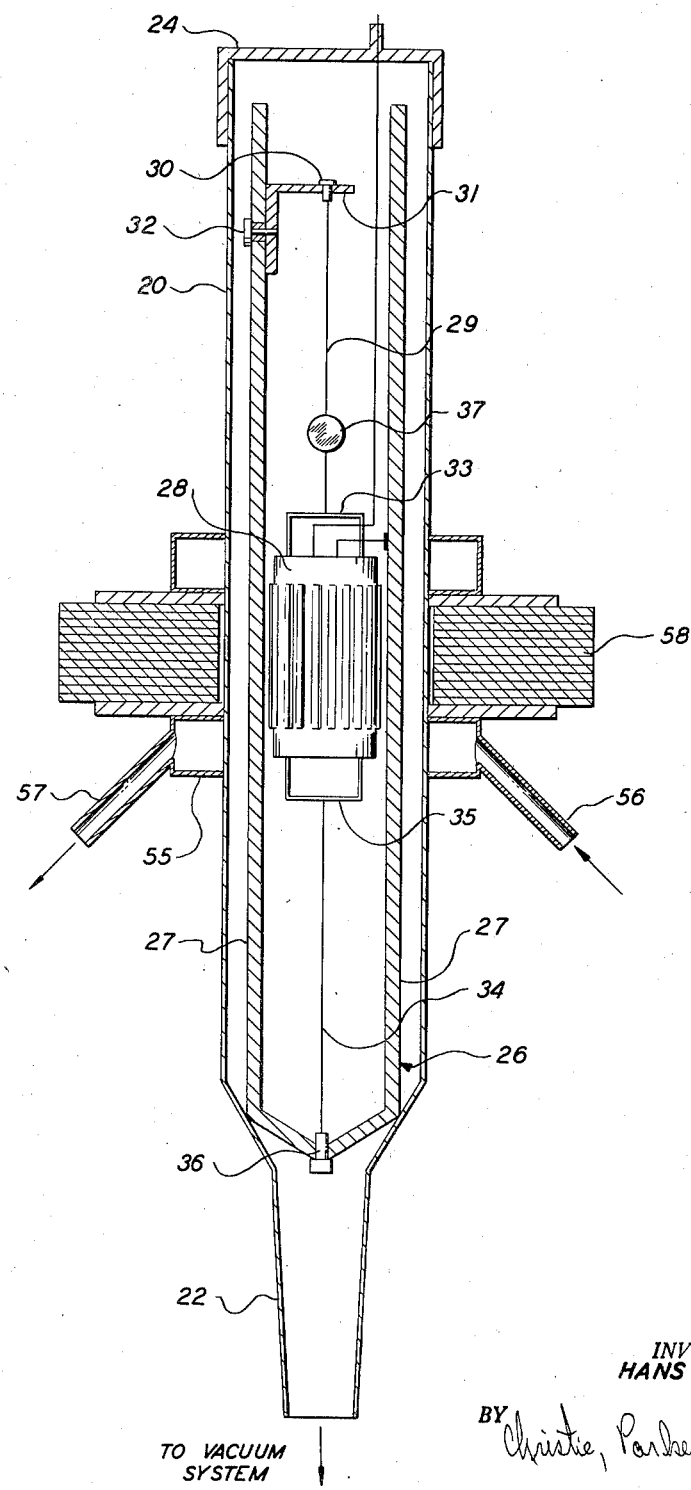
Fig. 1 is an elevation, partially in section, showing the presently preferred embodiment of the invention.

Referring to Fig. 1, the vacuum meter includes an elongated cylindrical housing 20 which may be of any suitable material, but for reasons explained below, preferably is of a diamagnetic material, such as copper or aluminum. A conduit 22 at the lower end of the housing is adapted to be connected to a vacuum system (not shown), the pressure of which is to be measured. The upper end of the housing is sealed by a cap 24.

An elongated U-shaped frame 26 of copper or some other suitable diamagnetic material is rigidly attached at its lower end to the inside and lower portion of the housing so that a pair of upright supports 27 on each side of the frame extend upwardly adjacent the inside wall of the housing. An upright cylindrical sleeve 28 is coaxially disposed in the central portion of the housing and is suspended for rotation about a vertical axis by an upper suspension ribbon 29 connected at its upper end by a tension screw 30 to a bracket 31 which is in turn connected to one of the supports of the frame with an adjusting screw 32. The lower end of the upper suspension ribbon is connected to the center of an inverted upper U-shaped stirrup, 33 attached at each end to the outside of the sleeve at diametrically opposed points. The upper end of a lower suspension ribbon 34 is connected to a lower U-shaped stirrup 35 attached at diametrically opposed points to the lower end of the sleeve. The lower end of the lower suspension ribbon is rigidly squeezed into a short section of capillary copper tubing 36 which is in turn attached to the center and lower portion of the U-shaped frame. Thus, the sleeve is mounted for rotation about the longitudinal axis of the housing. The suspension ribbons may be of any suitable material. Tungsten works well, as do quartz and bronze. The thickness of the ribbon should be less than 50 microns and preferably less than 25 microns. By using a ribbon or filament of about 1 micron, the measuring range of the gauge may be extended to $10^{-8}$ mm. of Hg. Using a quartz filament with a thickness of approximately 10 microns provides the advantage that the zero position of the sleeve is readily reproduced. The tension of the support ribbons may be varied by the tension screw or by adjusting the vertical position of the bracket on the frame support by the adjusting screw. A mirror 37 is attached to the upper suspension ribbon to reflect a beam of light (not shown) to provide a measure for the amount of rotation of the sleeve.

Figure 2:
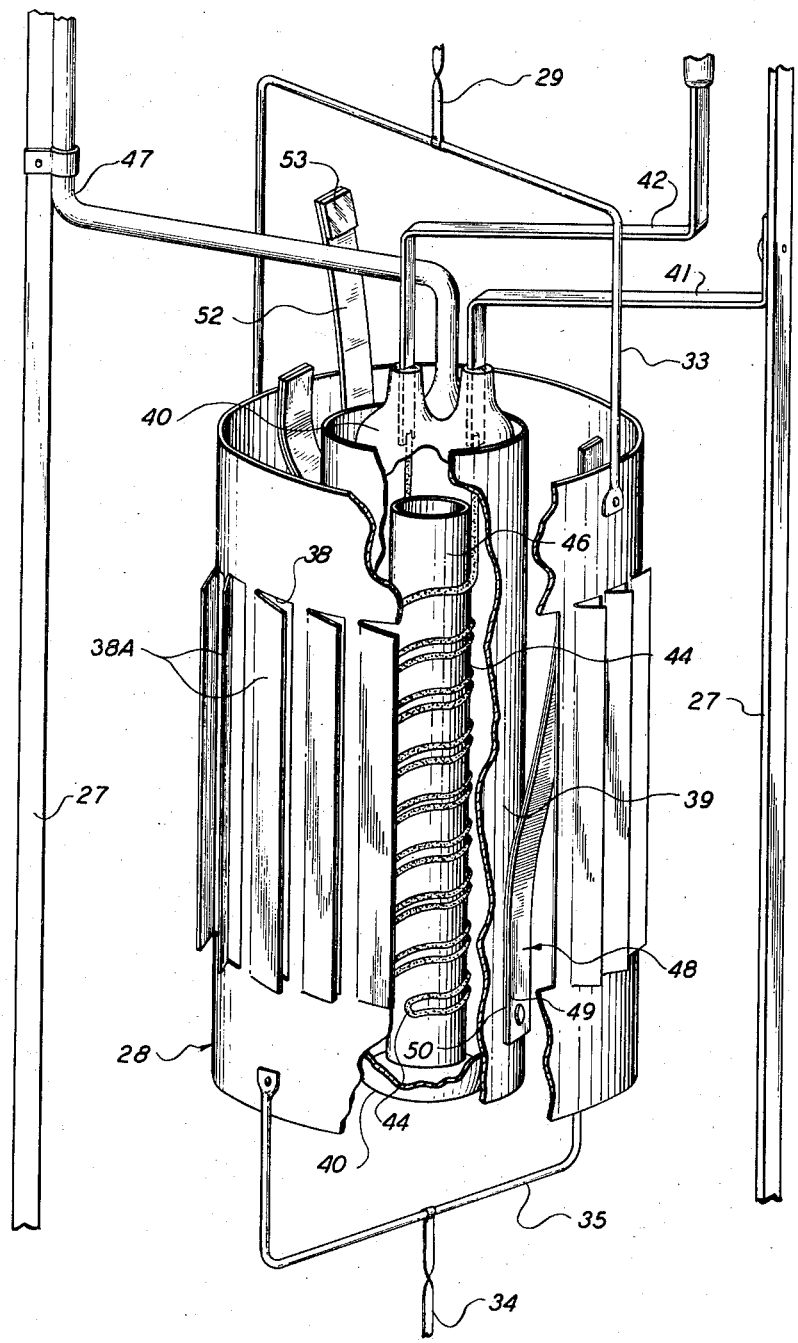
Fig. 2 is a perspective view, partially broken away, showing the movable sleeve and the primary parts within the sleeve.

As shown most clearly in Fig. 2, the sleeve has in its intermediate portion a plurality of elongated and longitudinal slots 38 and vanes 38A formed integrally with the sleeve and bent outwardly at a slight angle to lie in planes parallel to the longitudinal axis of the sleeve. The length of the sleeve is preferably several times its radius.

The sleeve may be made of any suitable material, but aluminum foil of 20 microns thickness has been found particularly satisfactory since the aluminum forms an oxide layer which is resistant to attack by most gases or vapors found in vacuum systems.

Referring to Fig. 2, an inner cylinder 39 of substantially the same length as the sleeve is coaxially disposed within and spaced from the sleeve. Each end of the inner cylinder is sealed by a glass closure 40. The cylinder is supported by a first electrode 41 connected to the frame and by a second electrode 42 sealed through the cap of the housing. Each electrode is sealed through the upper closure for the inner cylinder and is connected to a heating coil 44 wound around a core 46 within the inner cylinder. A glass capillary tube 47 is sealed to the upper closure for the inner cylinder and extends over to and up one of the support members of the frame. Preferably the inner cylinder is filled with oil (not shown) to improve the heat transfer between the heating element and the cylinder. The capillary tube accommodates the expansion of the oil and serves as a thermometer to indicate the temperature of the inner sleeve. If the temperature of the inner sleeve is measured by some other suitable means, the capillary tube may be omitted and the inner cylinder filled with quartz or some other suitable material to aid in heat transfer.

To lock the rotatable sleeve against shock and vibration when the instrument is not in use, a pair of elongated bimetallic locking elements 48 are attached at their lower ends to the lower portion of the inner cylinder. The elements are attached at diametrically opposed points on the inner cylinder, and preferably the contact between the elements and the inner cylinder is over a relatively large area to insure rapid heat transfer from the electrode to the elements. Each element extends longitudinally up the annular space between the sleeve and the inner cylinder and is curved first concave toward the sleeve and then concave toward the inner cylinder.

Each bimetallic element includes a first strip 49 of one metal and a second strip 50 of another metal having a coefficient of expansion different from the first metal. The two strips are bonded together along a common major surface. With the arrangement shown in Fig. 2, the metal with the larger coefficient of expansion is on the outside of the strip so that as the inner cylinder is heated, each element is deformed away from contact with the sleeve. Each element is also designed so that when the heating coil is turned off, the elements cool so that they are deflected outwardly at their upper ends a sufficient distance to engage and lock the sleeve against vibration or rotation. The elements are also selected so that normal fluctuations in daily and seasonal temperatures do not cause the element to move out of contact with the sleeve when the heating coil is off, nor to move into contact with the sleeve when the heating element is on.

The bimetallic elements are secured to the inner cylinder by any suitable means, for example by spot welding. They are also dimensioned so that when the heating coil is turned on the sleeve is released in about two to five minutes. A current of 1.2 to 1.5 amps. at 2 volts is sufficient to heat the inner cylinder to a necessary temperature and to release the sleeve in the time stated. The bimetallic elements may be of any suitable combination of metals, for example, copper, nickel, and nickel-iron alloys.

In the pressure range below about $10^{-2}$ mm. of Hg the thermomolecular pressure and the deflection of the sleeve is proportional to the existing gas pressure. At pressures greater than $10^{-2}$ mm. of Hg the deflection of the sleeve is inversely proportional to the gas pressure. Therefore, it is desirable to have a means for determining the general pressure range in which the instrument is operating. For this purpose, a bimetallic indicating element 52 is attached at its lower end to the lower portion of the inner cylinder and projects upwardly above the upper end of the sleeve. A miror 53 is mounted on the upper end of the indicating element to reflect a beam of light (not shown) to provide an indication of the gas pressure in the vicinity of the instrument, since the temperature and deflection of the element are dependent upon the rate at which it is cooled by the surrounding gas. Thus, by the position of the upper end of the indicating element, it can be ascertained whether the pressure surrounding the instrument is greater or less than $10^{-2}$ mm. of Hg.

Referring to Fig. 1, the portion of the housing adjacent the sleeve has an external cooling jacket 55 with an inlet 56 and an outlet 57 through which suitable cooling media, such as water or liquid air, is circulated to provide a cold surface adjacent the hot surface of the inner cylinder.

A magnet 58 around the housing adjacent the sleeve dampens the oscillations of the sleeve by eddy currents.

The operation of the instrument shown in Figs. 1 and 2 is as follows:

With the heating coil turned off, the bimetallic locking elements are deflected against the inner wall of the sleeve and restrain it from rotation and vibration. To make a measurement, the heating element is turned on, causing the inner cylinder to warm-up and retract the elements from contact with the sleeve. This also establishes thermal gradient between the inner cylinder and the housing. Thus, gas molecules in the vicinity of the sleeve are driven outwardly from the inner cylinder with greater energy than they move toward the hot cylinder. The flow of gas molecules outwardly through the slots in the sleeve acts on the vanes to cause the sleeve to rotate. The amount of rotation depends on the temperature difference between the inner cylinder and the housing, and on the gas pressure. By knowing the temperature difference between the inner cylinder and the housing, the gas pressure is determined, the instrument having previously been calibrated, say with a McLeod gauge.

As soon as the instrument is turned off, the inner cylinder cools and the locking elements move outwardly to lock the sleeve against rotation or vibration.

Figure 3:
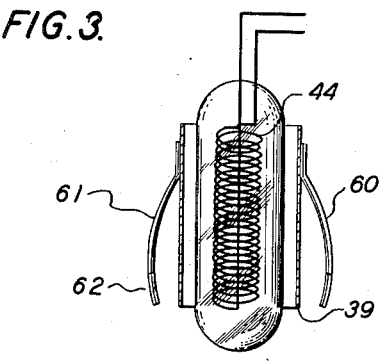
Fig. 3 is a schematic elevation of one form of bimetallic strips adapted to lock the movable sleeve.
Figure 4:
Fig. 4 is a plan view of the apparatus of Fig. 3.

An alternative arrangement for attaching the locking elements to the inner cylinder is shown schematically in Figs. 3 and 4. In this arrangement, two elongated bimetallic elements 60 are attached at their upper ends on diametrically opposed sides to the upper portion of the inner cylinder. Beginning with the upper end of the strip, they are bent outwardly to extend down and away from the inner cylinder and near the lower ends they are curved inwardly toward the inner cylinder. Each element is formed in an upper section 61 and a lower section 62. The upper section has a metal with the greater coefficient of expansion on the outside and the lower section has that metal on the inside. With this arrangement, when the instrument is in operation, the elements are deflected toward the inner cylinder, releasing the sleeve. When the instrument is turned off, the elements move outwardly to engage the inner cylinder and due to the reversal of the arrangement of the metals in the lower section of the element, the lower end of the element is deflected in an opposite direction so that contact between the strip and the sleeve takes place over a larger area. This results in a more uniform distribution of the locking forces over a larger area, and improves the arresting characteristics of the locking elements.

Figure 5:
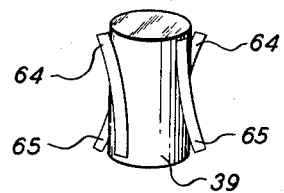
Fig. 5 is a perspective view of another method for mounting bimetallic strips.
Figure 6:
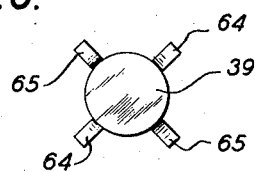
Fig. 6 is a plain view of the apparatus of Fig. 5.

In the embodiment shown in Figs. 5 and 6, a first pair of bimetallic elements 64 are connected at their lower ends on diametrically opposed points of the lower portion of the inner cylinder, and extend upwardly and outwardly from the cylinder. A second pair of bimetallic elements 65 are attached at their upper ends to diametrically opposed points at the upper end of the inner cylinder, and extend downwardly and outwardly from the cylinder. As shown in Fig. 6, the bimetallic elements are spaced at equal intervals around the inner cylinder. With this arrangement when the inner cylinder is cold, the first pair of bimetallic elements are spread outwardly at the upper portion of the cylinder, and the second pair of elements are spread outwardly at the lower portion of the cylinder so that the sleeve is firmly secured at both ends.

Figure 7:
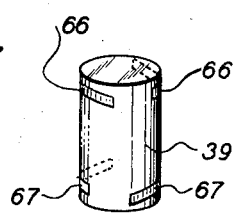
Fig. 7 shows in perspective another form in which bimetallic strips may be used.
Figure 8:
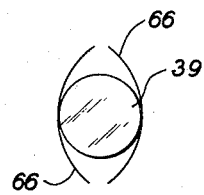
Fig. 8 is a plan view of the apparatus of Fig. 7.

In the embodiment shown in Figs. 7 and 8, an upper pair of bimetallic elements 66 are welded at their respective centers to diametrically opposed points at the upper end of the inner cylinder. A lower pair of bimetallic elements 67 are welded in a similar fashion directly below the upper pair and at the lower end of the inner cylinder. All of the metal strips extend horizontally and at right angles to the axis of the inner cylinder so that when they are cold they apply themselves against the inner surface of the sleeve with the approximate curvature of the inner cylinder.

Figure 9:
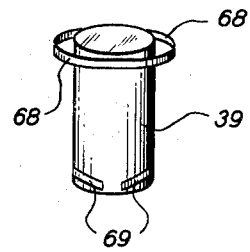
Fig. 9 is a perspective view of yet another way for mounting bimetallic strips.
Figure 10:
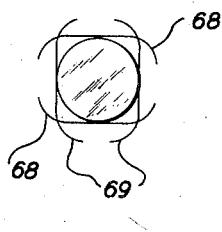
Fig. 10 is a plan view of the apparatus of Fig. 9.

In the arrangement shown in Figs. 9 and 10, an upper pair 68 of bimetallic elements are welded at their respective centers to diametrically opposed points of the upper portion of the inner cylinder, and a lower pair 69 are welded in a similar fashion to the lower end of the inner cylinder at a 90° angle to the upper pair. With this arrangement in both the cold and warm condition, the bimetallic elements form a symmetrical shape, and in the cold condition no distorting forces are transmitted by the elements to the suspension system of the sleeve.

I claim:

1. In an apparatus for measuring low gas pressures by means of thermo-molecular pressure gradients developing between hot and cold surfaces, the combination of a vacuum-tight sealed cylindrical housing forming a cold surface, means for connecting said housing to a vacuum container, an axio-symmetrically arranged member having a cylindrical surface mounted in said housing, means for heating said cylindrical surface to produce a temperature difference between it and the cold surface, an axio-symmetrically arranged cylindrical feeler member mounted between the said surfaces, means for supporting said feeler member so as to be movable in response to the thermo-molecular gradient between said surfaces, and automatic arresting means for arresting the feeler member in a substantially impact- and vibration-free manner when the apparatus is out of use, said arresting means comprising a plurality of bimetallic strips of asymmetrical heat expansion, and means for securing each strip to the inner cylindrical surface, each strip being so constructed as to apply itself along a generatrix of said cylindrical surface when it is heated while becoming deflected when said heating means is inoperative so as to apply at least one of its ends with pressure against an annular end zone of the feeler member.

2. The apparatus of claim 1, wherein said heating means is an electrical heating means arranged axio-symmetrically within said cylindrical surface, and said feeler member is a hollow cylinder, consisting of two annular end portions and a central portion, the central portion comprising a plurality of vanes extending parallel to the cylinder axis and laterally projecting from the cylinder surface, each vane forming an angle with a cylinder radius at the vane so that a radially outwardly acting thermo-molecular pressure will exert a torque upon the feeler member.

3. The apparatus of claim 2, wherein said electrical heating means comprises an electric resistance coil, a ceramic carrier arranged inside said coil to support the same, a tube of material selected from the group consisting of vitreous and ceramic materials enclosing said coil and carrier in a vacuum-tight manner, and metallic supply electrodes for said coil constructed to carry said heating means.

4. The apparatus of claim 1, comprising also another bimetallic strip connected to the inner cylindrical surface and forming an indicating device, the pressure measuring range being approximately indicated by the deflection of said other bimetallic strip at a given temperature upon removal of heat from said cylindrical surface.

5. The apparatus of claim 1, wherein each bimetallic strip is secured with one of its ends to said inner cylindrical surface while its other end is deflected toward the cylindrical surface upon heating thereof and toward the annular end zone of the feeler member when the heating means is inoperative, thereby arresting said feeler member.

6. The apparatus of claim 5, wherein each of said bimetallic strips consists of two laminated parts with opposite flexing characteristics.

7. The apparatus of claim 1, wherein each bimetallic strip is secured at its center to said inner cylindrical surface in a plane perpendicular to the cylinder axis, the ends of each bimetallic strip being symmetrically deflected in the cold and heated condition.

8. The apparatus of claim 1, wherein the bimetallic strips are coupled to the inner cylindrical surface with the metal part of smaller heat expansion facing said inner cylindrical surface so that the feeler member is automatically released when the apparatus is placed in operative condition for pressure measurement and is automatically arrested upon placing the apparatus in inoperative condition.

9. The apparatus of claim 1, wherein the bimetallic strips are so dimensioned that deflections produced by normal daily and seasonal temperature variations do not influence the arresting position of the strips during inoperative condition of the apparatus and do not result in obstruction of movement of the feeler member when the heating means is operated.

10. A vacuum gauge adapted to be connected to a vacuum system and measure gas pressure by means of thermo-molecular pressure developed between two surfaces of different temperatures, the gauge including a first member, a second member spaced from the first member, means for producing a temperature difference between the two members, a movable body disposed between and spaced from the two members so that it is deflected by moving gas molecules when there is a temperature difference between the two members, and a plurality of bimetallic thermal expansion elements connected to one of the members, each expansion element being disposed to be spaced from the movable body when the member to which the elements are attached is at one temperature, and to engage the body and lock it against movement when the temperature of the member to which the expansion elements are attached is at a different temperature.

References Cited in the file of this patent

UNITED STATES PATENTS

| | | |
|---|---|---|
| 1,762,859 | Gebhard | June 19, 1930 |
| 2,602,332 | Turner et al. | July 8, 1952 |
| 2,655,044 | Dumond | Oct. 13, 1953 |

FOREIGN PATENTS

| | | |
|---|---|---|
| 648,380 | Germany | Aug. 2, 1937 |
| 695,038 | Germany | Aug. 14, 1940 |
| 746,225 | Germany | June 19, 1944 |